United States Patent
Carlson et al.

(10) Patent No.: US 6,285,476 B1
(45) Date of Patent: Sep. 4, 2001

(54) LASER COMMUNICATION SYSTEM AND METHODS

(75) Inventors: Robert T. Carlson, Downingtown; Jesse W. Booker, Exton; Alvin Cabato, Plymount Meeting, all of PA (US); David Driscoll, Winchester, MA (US); Scott Hamilton, Downingtown, PA (US)

(73) Assignee: LSA, Inc., Arlington, VA (US)

( * ) Notice: Subject to any disclaimer, the term of this patent is extended or adjusted under 35 U.S.C. 154(b) by 0 days.

(21) Appl. No.: 09/235,767

(22) Filed: Jan. 25, 1999

Related U.S. Application Data

(60) Provisional application No. 60/088,971, filed on Jun. 10, 1998.

(51) Int. Cl.[7] .................................................. H04B 10/24
(52) U.S. Cl. ......................... 359/114; 359/152; 359/153; 359/159; 359/193
(58) Field of Search .................................. 359/114, 152, 359/153, 159, 193

(56) References Cited

U.S. PATENT DOCUMENTS

| | | | |
|---|---|---|---|
| 5,140,451 | * 8/1992 | Talat et al. ............................. | 359/114 |
| 5,253,260 | * 10/1993 | Palombo ................................. | 372/34 |
| 5,264,955 | 11/1993 | Sakanaka et al. . | |
| 5,283,681 | * 2/1994 | Hoshino et al. ........................ | 359/198 |
| 5,347,387 | 9/1994 | Rice . | |
| 5,351,060 | * 9/1994 | Bayne ..................................... | 343/766 |
| 5,363,386 | * 11/1994 | Smith ..................................... | 372/6 |
| 5,390,040 | 2/1995 | Mayeux . | |
| 5,422,900 | 6/1995 | Reele et al. . | |
| 5,424,860 | 6/1995 | Mihara . | |
| 5,448,391 | * 9/1995 | Iriyama et al. ........................ | 359/159 |
| 5,465,170 | * 11/1995 | Arimoto ................................. | 359/159 |
| 5,506,716 | 4/1996 | Mihara et al. . | |
| 5,594,580 | * 1/1997 | Sakanaka et al. ..................... | 359/172 |
| 5,610,748 | * 3/1997 | Sakanaka et al. ..................... | 359/154 |
| 5,627,669 | * 5/1997 | Orino et al. ........................... | 359/156 |
| 5,651,019 | * 7/1997 | Goldberg et al. ...................... | 372/68 |
| 5,659,413 | 8/1997 | Carlson . | |
| 5,680,241 | * 10/1997 | Sakanaka et al. ..................... | 359/172 |
| 5,710,652 | * 1/1998 | Bloom et al. .......................... | 359/152 |
| 5,729,376 | * 3/1998 | Hall et al. .............................. | 359/366 |
| 5,756,991 | * 5/1998 | Risinger et al. ................... | 250/252.1 |
| 5,786,923 | * 7/1998 | Doucet et al. ......................... | 359/172 |
| 5,870,215 | * 2/1999 | Milano et al. ......................... | 359/172 |
| 6,032,041 | * 2/2000 | Wainfan et al. ....................... | 455/427 |

* cited by examiner

*Primary Examiner*—Leslie Pascal
*Assistant Examiner*—Hanh Phan
(74) *Attorney, Agent, or Firm*—Reed Smith Hazel & Thomas LLP

(57) ABSTRACT

A laser communication system for full duplex wideband data transmission includes first and second terminals having dichroic wavelength-multiplexed optical systems wherein transmitted and received light are multiplexed along a path through the same aperture. The optical systems each preferably comprise a cassegrain receiver having primary and secondary mirrors for directing both transmitted and received laser light. Modulated laser light is generated by a high-power laser diode which is actively cooled by a thermoelectric cooler. A window in the housing, through which the modulated laser light travels, includes a transparent resistive coating to which electrical current is applied to control the temperature of the window. The aspheric primary mirror has a highly reflective surface, preferably a single-point diamond-turned mirror surface, formed on an aluminum substrate as a single piece.

47 Claims, 14 Drawing Sheets

MEDIA CONVERTER BLOCK DIAGRAM

TRANSMITTER ELECTRONICS
BLOCK DIAGRAM

RECEIVER ELECTRONICS
BLOCK DIAGRAM

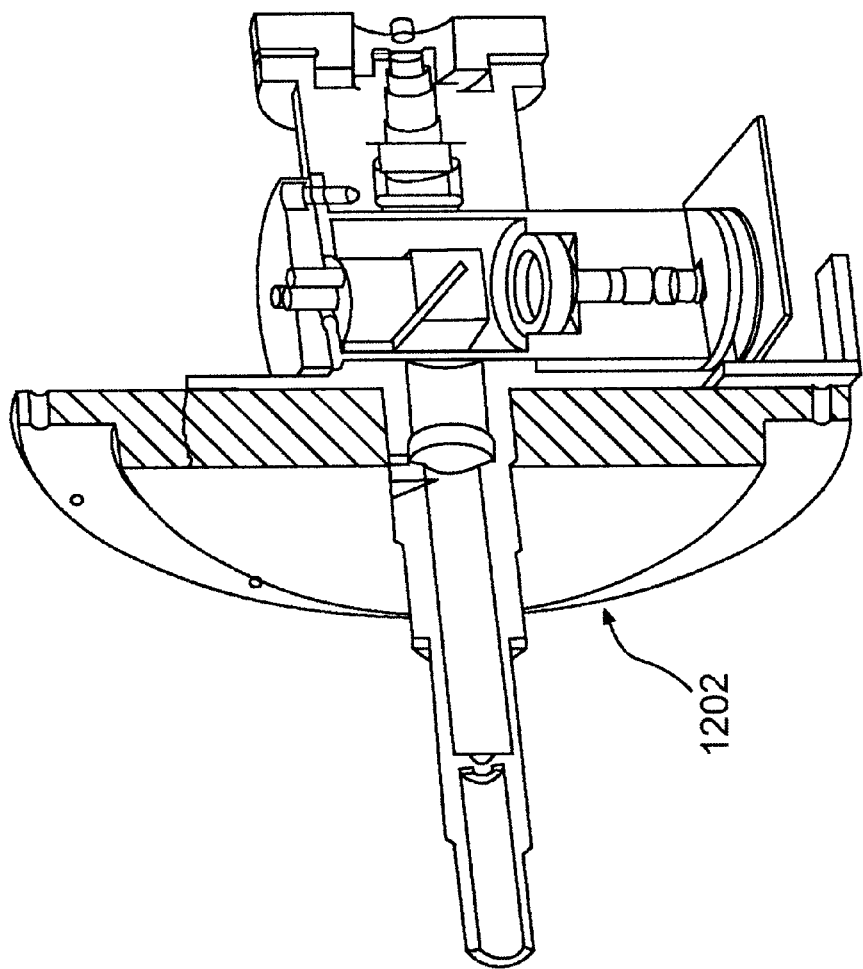
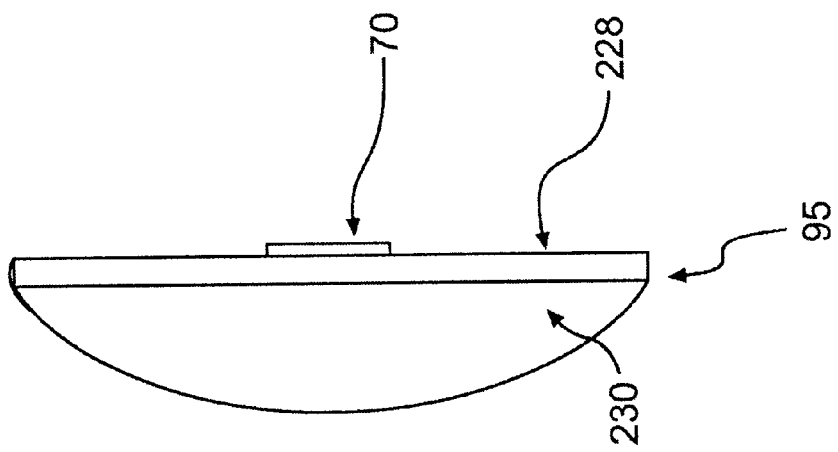
FIG. 12

LASER COMMUNICATION SYSTEM AND METHODS

This application claims the benefit of U.S Provisional Patent Application Ser. No. 60/088,971, filed Jun. 10, 1998, the entire disclosure of which is incorporated herein by reference.

A portion of this disclosure contains material in which copyright is claimed by the applicant. The applicant has no objection to the copying of this material in the course of making copies of the application file or any patents that may issue on the application, but all other rights whatsoever in the copyrighted material are reserved.

BACKGROUND OF THE INVENTION

1. Field of the Invention

The present invention relates generally to structures and techniques which are useful in high bandwidth laser communications equipment, laser radar, visible and infrared remote sensing equipment, long range, and to methods of making and using such systems.

2. Related Art

Wideband (high-speed) data transfer at rates in excess of 1.5 Megabits-per-second (Mbps) is expensive for dedicated bandwidth (e.g., leased lines) over the existing telecommunications infrastructure. Over modest ranges where an unobstructed line of sight exists, a laser communication link can provide an alternative means of obtaining dedicated bandwidth at high data rates.

For this and other reasons, wireless information transmission systems in general are increasingly desirable as alternatives to costly wired installations and high telecommunications rates which prevail even for short distance communications. Radio frequency communications systems have the disadvantage of requiring that carrier frequency and communications bandwidth be assigned to an application, since the much wider beamwidths and sidelobes can interfere with each other. Thus, there is an increasing need for communications systems, such as those using light frequencies, that transmit large quantities of information in a line-of-sight application without creating interference problems.

Microwave systems are also line of sight, but the majority of such systems on the market are not capable of the desired data rates in excess of 10 Mbps (e.g., 45, 100 and 155 Mbps). The higher-bandwidth microwave systems (i.e. >10 Mbps) generally require Federal Communication Commission licensing, and are susceptible to terrain and building reflections, typically requiring tall towers which add significantly to the expense.

Free space laser communication within the atmosphere has been a realizable technology for many years, although commercially available laser communication systems are few in number. Manufacturers include Laser Communications Inc. (LCI) of Lancaster, Penn. (recently acquired by Jolt, Ltd. of Jerusalem, Israel), Proteon (formerly SilCom Technology) in Ontario, Canada, Canon USA in Englewood Cliffs, N.H. (Canobeam™), and AstroTerra Corp. in San Diego, Calif. (TerraLink™ terminals). Each of these systems includes a basic set of subsystems: diode laser, beam-forming optics, receiver (telescope plus detector), electronics, and a mechanical housing.

The AstroTerra™ terminals, so far as the inventors are aware, are the longest range terminals commercially available at this time. The range of such competing systems is less than the range provided by the present invention, and because of their design systems of this type are inherently less reliable and more costly to manufacture than the system developed by the inventors which is described in more detail herein.

U.S Pat. No. 5,347,387 to Rice discloses a duplex optical transceiver wherein received light energy entering the system is initially reflected from a paraboloidal mirror onto a beam expander mirror. The light reflected from the beam expander then passes through a light baffle and a polarized beam rotating device. Next, the recollimated beam is multiplexed through a cube beamsplitter and re-imaged onto an avalanche photodiode detector. In the transmit path, the semiconductor laser emission is circularized and collimated to the desired beam divergence before being multiplexed through a cube beamsplitter and transmitted out the transceiver. Because Rice uses polarization to multiplex incoming and outgoing light beams, his system is limited as to the bandwidth of transmitted data.

U.S. Pat. No. 5,390,040 to Mayeux discloses an optical transceiver that employs a Cassegrain receiver for receiving an incoming beam reflected from a field of view onto the central portion of a primary mirror, and a transmitter for transmitting an outgoing beam of a different wavelength into the atmosphere. In Mayeux, the transmitted and received beams travel along two separate paths inside the transceiver.

U.S. Pat. No. 5,422,900 to Reele et al. discloses an optical compact disk writer with an integrated laser module wherein a laser driver circuit connected to the input of a laser is completely shielded from electromagnetic interference (EMI) from the rest of the system. The reference also discloses a lower housing formed of metal to act as the laser's main heat sink. U.S. Pat. No. 5,640,407 to Freyman et al. discloses a temperature regulating laser diode assembly wherein a laser diode is mounted directly on a compact thermoelectric cooler, which is then mounted on a heat sink.

Other references, such as U.S. Pat. Nos. 5,264,955 to Sakanaka et al., 5,424,860 to Mihara, 5,506,716 to Mihara et al., 5,535,034 to Tanaguchi, 5,142,400 to Solinsky, and 5,659,413 to Carlson show other communications technology applications.

None of these prior systems provides an optimal solution to the problem of establishing useful and reliable laser information transmission systems with significant range and bandwidth. Therefore, there is a need in the field for improved systems and methods which meet these needs.

OBJECTS AND SUMMARY OF THE INVENTION

It is therefore an object of the invention to provide an improved laser communications system.

It is a further object of the invention to provide a laser communications system with increased range.

It is a further object of the invention to provide a laser communications system with increased bandwidth.

It is a further object of the invention to provide a laser communications system with improved reliability.

It is a further object of the invention to provide a laser communications system which is less costly to manufacture.

In a preferred embodiment of the invention, an optical transceiver employs a Cassegrain receiver for receiving an incoming beam from a field of view reflected off a primary mirror and focused through an aperture stop, and a transmitter for directing an outgoing beam of a different wavelength using the same primary and secondary mirrors.

Received light energy entering the system is initially reflected onto a primary mirror which then focuses the beam onto a secondary mirror. The light reflected from the secondary mirror next encounters a protruding snout light baffle and a field stop to filter out unwanted background light and off-axis light sources. The received energy passing through the field stop is collimated, wavelength multiplexed through a beamsplitter, optically filtered and then focused onto an avalanche photodiode detector.

In the transmit path, the semiconductor laser emission is circularized and adjusted to the desired beam divergence and passed through a narrowband dichroic optical filter. This laser transmitter energy is then dichroically multiplexed through a beamsplitter and transmitted out the transceiver. The laser driver assembly is thermoelectrically cooled and EMI shielded.

The transceiver internal optics in the preferred embodiment comprise a parabolic primary mirror and integral aluminum mount, and a secondary mirror. The transceiver is packaged in a cylindrical aluminum casting that includes an integral cast hood to shield the transmit/receive window from rain and snow, a cast mount for a sighting scope, and an integral cast heat sink. The exterior surface of the transmit/receive window is cold-mirror coated to reflect visible light and the majority of incident solar energy, and the interior surface utilizes an electrically conductive film as a thermally controlled resistive heater for defogging and deicing. The interior surface of the transmit/receive window provides a flat mounting surface for the secondary mirror.

The invention provides a cost-effective implementation for a wideband laser communication system suitable for atmospheric link ranges of 1–20 km. Each laser communication link is line-of-sight and point-to-point between a pair of terminals and can be integrated into a network of multiple links, as well as interfaced with other communications networks.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 12 shows the window assembly of FIG. 11 in combination with a sectional view of the transceiver optics;

DETAILED DESCRIPTION

The present invention will be described generally in terms of a wireless atmospheric laser communication system, typically for use over ranges of 1–20 km, for high-speed data, voice, and/or video transmission at rates in excess of 1.5 Mbps. Those skilled in the art will also recognize that the architectures and methods disclosed herein have applications in laser radar, visible and infrared remote sensing equipment, and other similar applications, all of which are contemplated as part of the invention.

Figure 1:
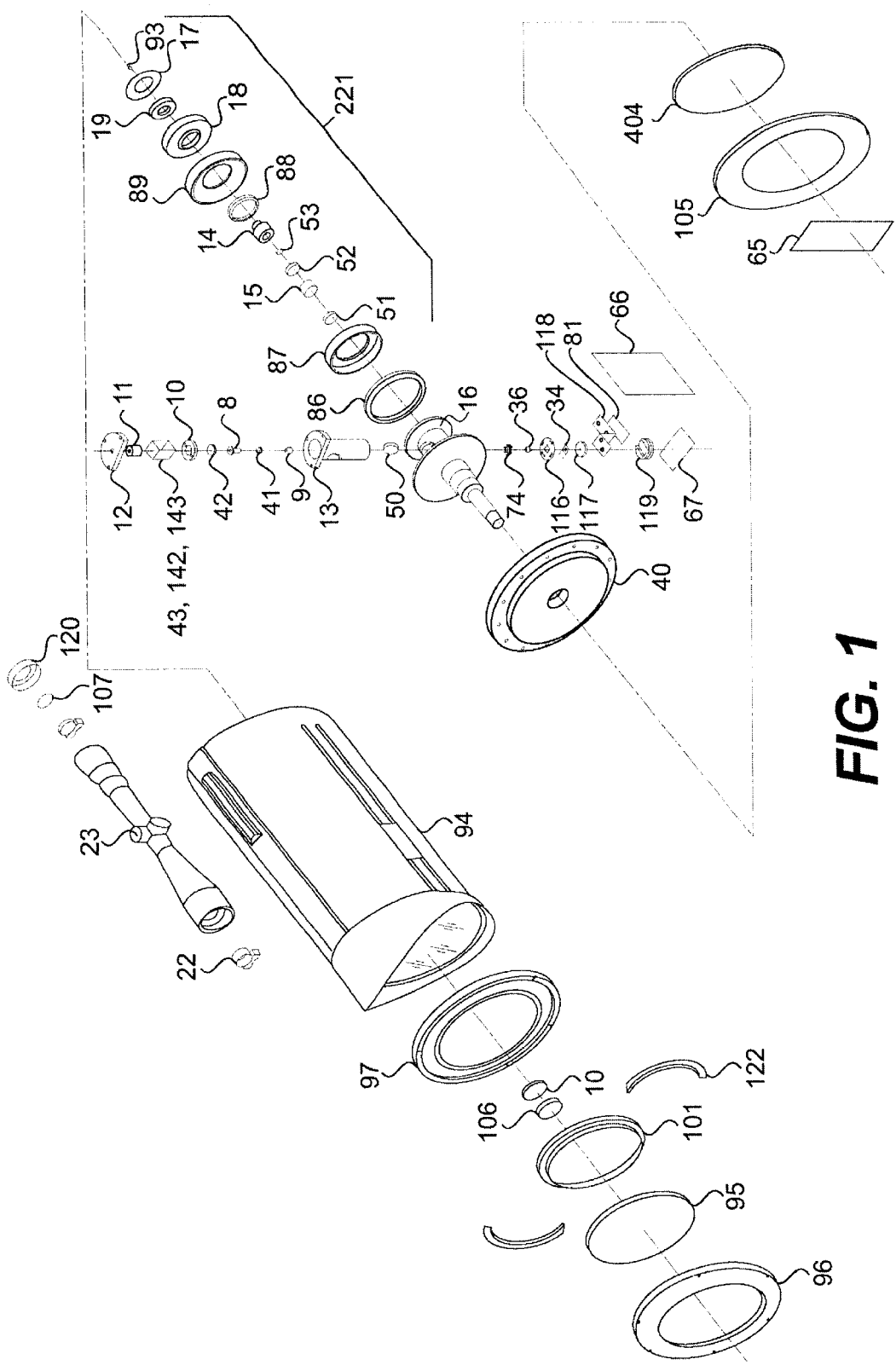
FIG. 1 is an exploded view showing the opto-mechanical assembly of a preferred embodiment of the invention.

FIG. 1 is an exploded view showing the mechanical assembly of a preferred embodiment of the invention. A cast housing 94 supports several subassemblies, including the window assembly 191, laser assembly, focussing adjustment 221, receive and transmit optics, sighting scope 23, primary and secondary mirrors 40 and 70, laser driver electronics board 67, and receiver electronics. The components of these subassemblies will now be described generally with reference to FIG. 1, and will be described in greater detail below.

The window assembly 191 includes a heated monolithic window element 95, casting window mount 94 to which a secondary mirror 70 and secondary mirror spacer 106 are mounted, a connecting ring 101, berylium copper contact strips 122, casting window retainer 97, casting window mount 94.

The laser assembly preferably comprises a diode laser which is thermally isolated and actively cooled (or heated) with a thermoelectric cooler (TEC) 34. The TEC preferably comprises a TEC of appropriate size, current and cooling capability for the specific application. Temperature control is further provided by top and bottom TEC insulators 116 and 119, respectively, TEC heat sink 117, a thermal strap 118, and thermal gap pad 81. The laser assembly further comprises a laser collimating lens 41, a transmitter bandpass filter 42, beamsplitter prisms 143, absorption filter 142, and beamsplitter plate 43. The components of the laser assembly are mounted in a laser tube 13 using appropriate mounting hardware, e.g., beamsplitter base 12, beamsplitter mount 11, laser retainer ring 10, push spacer 8, laser spacer 9, and nylon laser insert 74.

The focussing adjustment 221 for the receiver preferably comprises a threaded zoom base 87, receiver bandpass filter 51, receiver spacer 15, receiver second collimating lens 52, receiver focussing lens 53, zoom cell 89, translation stage 19, translation stage plate 17, and translation stage frame 18. The focussing adjustment assembly 221 is encased in the receiver tube 16 and is secured therein by a receiver tube retainer 14, DELRIN ring 88, and a receiver tube locking ring 86.

The receiver includes a first collimating lens 50, a second collimating lens 52, an avalanche photodiode 93 and receiver electronics board 65. An input/output (I/O) electronics board 66 is provided for interfacing the media converter (which interfaces to customer equipment) to the transmitter (laser diode)/receiver electronics. See FIG. 5. The I/O electronics board 66 also handles other input/output functions such as powering up the laser, EMI and surge suppression, EMI filtering, and Light-Emitting Diode (LED) display of system status and diagnostics.

A back plate 104 provides a surface for mounting status and diagnostic LEDs, and is secured to the cast housing 94 via a back plate bezel 105. The alignment scope 23 preferably comprises a suitable rifle scope for the desired range and other application-specific requirements, and includes an alignment scope filter 107, eye filter mount 120, and dovetail mounting rings 22.

The subassemblies discussed above will now be described in further detail.

Figure 2:
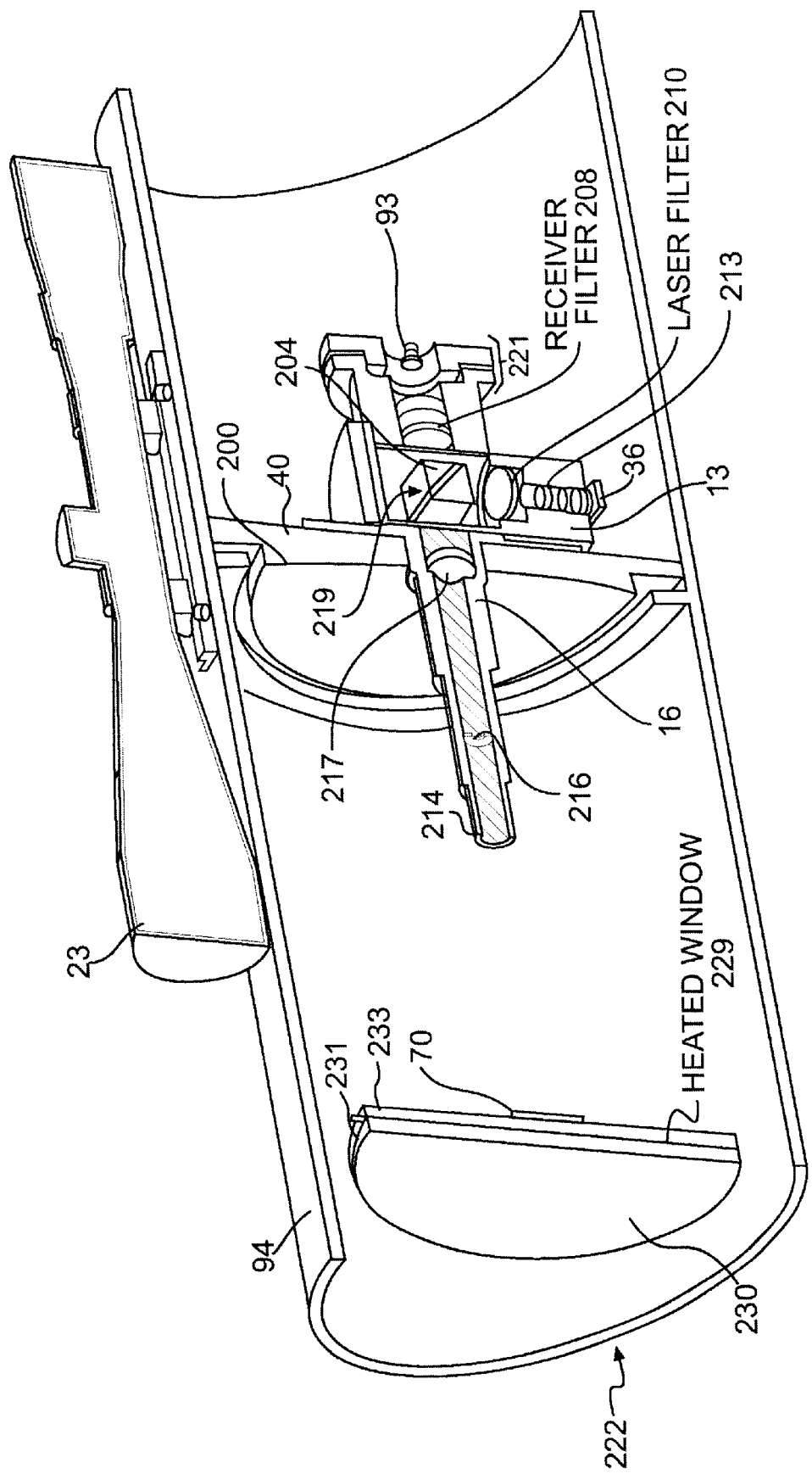
FIG. 2 is a cutaway view of the opto-mechanical assembly of FIG. 1.

FIG. 2 is a cutaway view of the mechanical assembly of FIG. 1 which shows the assembly of the receive and transmit optics in more detail, including the mirror substrate 40, primary mirror surface 200, secondary mirror 70, beamsplitter 204, photodetector 93, receiver filter 208, receiver optics 217, laser filter 210, laser 36, baffle 214, and field stop 216. These elements are mounted in the housing 94, to which sighting scope 23 is attached. FIG. 2 also shows an alternative embodiment of the window assembly provided in the system. Glass plates 231, 233 are provided and a heating element 229 is sandwiched between plates 231 and 233. Secondary mirror 202 is attached to the inwardly facing surface of inner plate 233, and cold mirror coating 230 is provided on the outward facing surface of outer plate 231.

One unique feature of the present invention is its single point diamond turned primary mirror surface 200, formed on a thick aluminum substrate 40 as a single piece, nominally 4"–10" clear aperture, of aspheric (parabolic) form, which can be cost effectively realized in high volume production as a replicated optical surface. The parabolic surface figure is optimized for the on-axis transmit and receive functions of the telescope. Aluminum substrate 40 provides a mechanical strongback and mounting interface to cast housing 94.

Receiving aperture 222 is larger than that provided in prior art devices such as those made by Proteon (formerly SilCom) or LCI. The collected energy is proportional to the area of the receiving optics, so that the present invention, even with a 6" aperture, provides an advantage of a factor of four over 3-inch receivers and a factor of nine over 2-inch receivers. The larger aperture 222 also allows greater aperture averaging in the present invention, which reduces intensity fluctuations induced by atmospheric turbulence.

The aluminum mirror substrate 40 is also the reference surface for the transmit and receive path refractive optics and their housing. The aluminum mirror has a highly reflective, non-tarnishing optical coating applied to ensure high transmission specifically for the wavelengths of interest. The transmit (laser) and receive (detector) paths are dichroically wavelength multiplexed, with different laser wavelengths used for each paired transmitter and its corresponding receiver. In a preferred embodiment, the present invention employs lower cost near-infrared diodes (e.g. 810 nm and 850 nm), but the invention is not limited to this embodiment. Any desired pair of wavelengths may be used in appropriate applications, from visible wavelengths through 1550 nm and longer.

Field stop 216 in the receive path optics, in conjunction with a long "snout" provided on baffle 214 that protrudes well beyond this aperture stop and acts as a light baffle, provides spatial filtering of unwanted background light and off-axis light sources (i.e., a very narrow receiver field of view), preventing unwanted light from passing through the system and being imaged onto the detector. These features, and band pass filtering of the incoming light wavelengths, permits the system to operate even when the sun or other light sources are very close to the receiver line of sight.

The present invention preferably uses a high power 200 mW GaAlAs diode laser 36, operating at one of two predetermined wavelengths matched with a corresponding receiver. Thus, a matched pair of transceivers, each using one of the two predetermined transmitting wavelengths and receiving at the other wavelength, are provided at opposing ends of each communications link. The laser diode is preferably actively cooled by a thermoelectric cooler in a manner which will be described in more detail below. Prior art products such as those made by LCI and Proteon (formerly SilCom) used uncooled 40 mW diodes. By combining a much higher power laser with a thermoelectric cooler, the present invention has a five-fold power advantage over prior art designs without adversely affecting reliability of the system through production of excess heat.

The received energy passing through field stop 216 is collimated by optics 217, optically filtered in filter 208 to reduce background light and spontaneous and stimulated emissions for the transmitter, and then focused onto photodetector 93, which is preferably an avalanche photodiode (APD) for maximum receiver sensitivity.

In the transmit path, the emission of semiconductor laser 36 is circularized and captured by optics 213 that establish the desired transmit beam divergence. This laser transmitter energy passes through narrowband optical filter 210 to prevent spontaneous emission from causing crosstalk in the receive channel, and is then dichroically multiplexed through cube beamsplitter 204 to the common-path beam expansion optics 202 and 200 and transmitted out of the telescope. An index-matched absorptive beam block 219 is used at the beamsplitter so as to minimize laser leakage through the beamsplitter coating that is scattered and reflected back to the detector. The laser transceiver of the present invention is packaged in aluminum housing 94 which is a one-piece casting, suitable for cost-effective high volume production, that is essentially cylindrical in shape and includes an integral cast hood as a distinctive feature to shield the window from rain and snow, an integral cast mount for a sighting scope 23, and an integral cast heat sink.

Prior art reflective systems typically used off-the-shelf telescopes, resulting in bulky systems with lower reflectivities and sub-optimum antireflection optical coatings. In the present invention, the primary mirror forms the structural backbone for essentially all the optical components, resulting in a compact design. The magnification of the telescope provided herein reduces angular tolerances between the transmitter and receiver and relaxes the air-spacing tolerance between the diode laser 36 and the collimating lens 213.

The optomechanical design for the internal optics in the preferred embodiment of the invention consists of two main subassemblies that facilitate rapid assembly and accurate boresight alignment of the transmit and receive beams. Receiver tube assembly 16 is a single machined or cast unit that incorporates baffle snout 214, field stop 216, the reference surface that mates to the primary mirror substrate 40, an orthogonal aperture for insertion of the transmitter assembly, and the receiver focusing lenses and spacers. A 3-axis translation stage, including a focus adjustment 221 along the optical axis, is attached to the receiver tube and carries the APD detector. The translation and zoom capability is used to properly position the APD when boresighting the receiver detector to the transmit laser. The transmitter tube assembly 13 slides into the receiver tube assembly 16, and contains the beamsplitter cube 204 and its tip-tilt mount, the beam-shaping optics 213 and optical filter 210 for the laser, and the laser mount and thermal isolation assembly.

Figure 3:
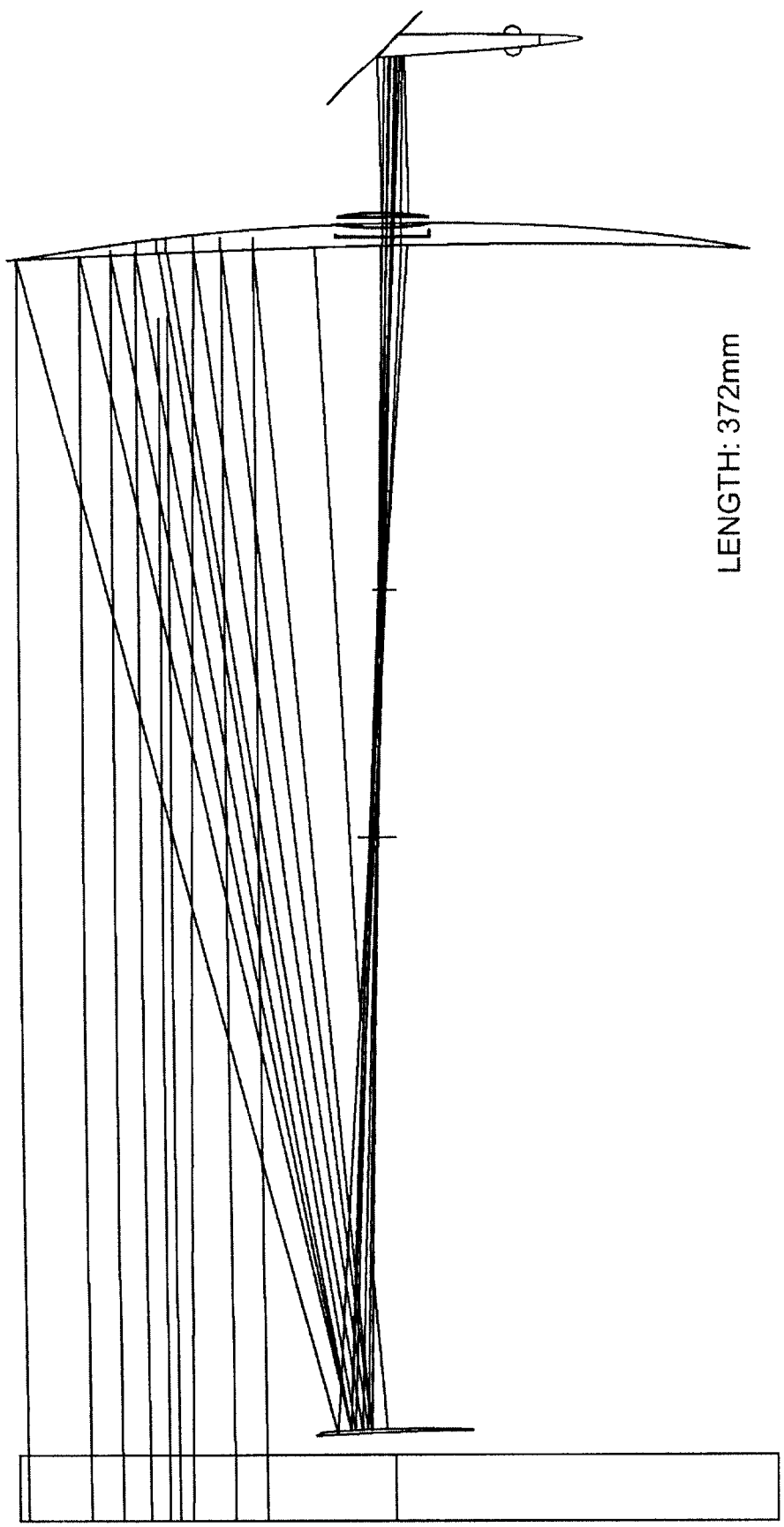
FIG. 3 is a diagram of the optical layout of the transmitter path of the preferred embodiment.
Figure 4:
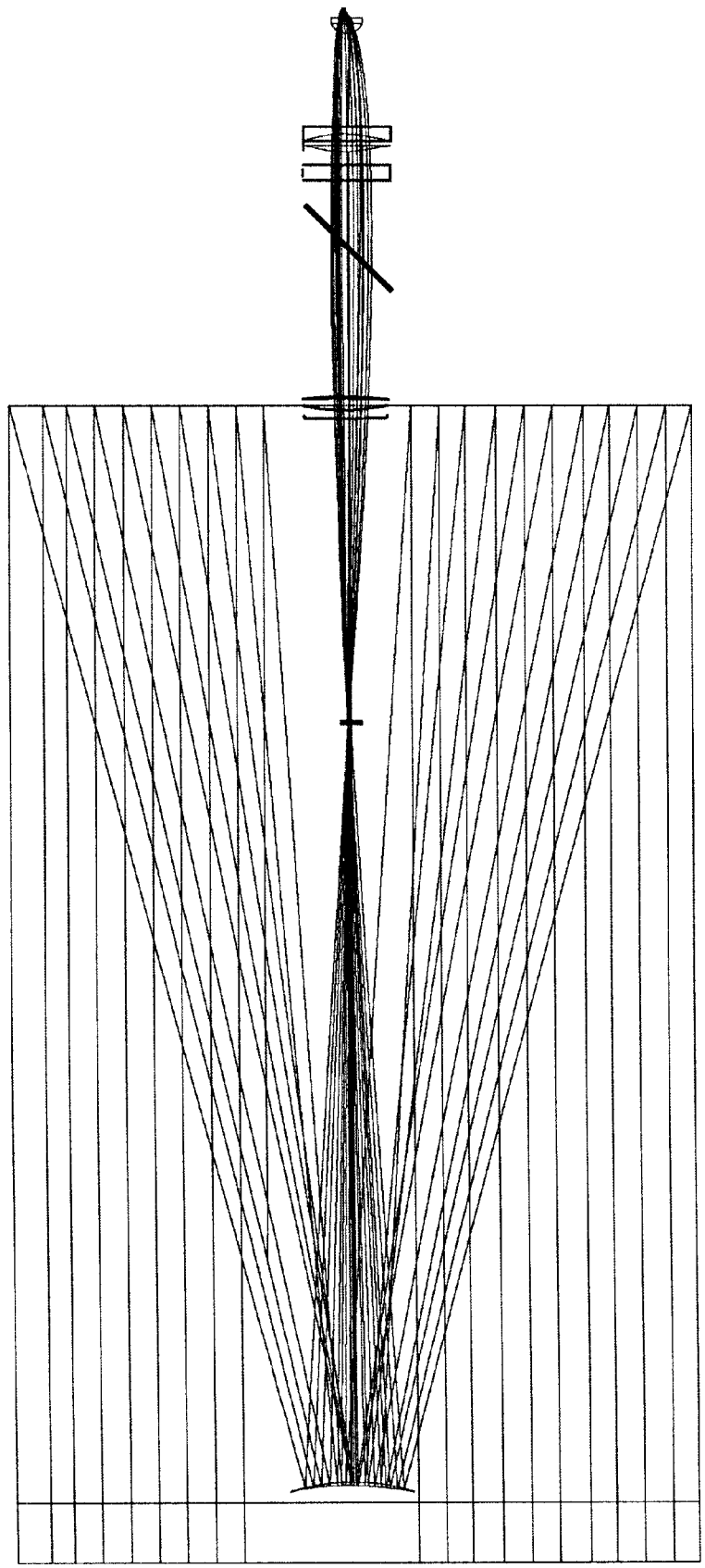
FIG. 4 is a diagram of the optical layout of the receive path of the preferred embodiment.

FIG. 3 is a diagram showing in more detail the transmitter light path in the preferred embodiment as described above. FIG. 4 is a similar diagram showing the receive path of the preferred embodiment in more detail.

Figure 5:
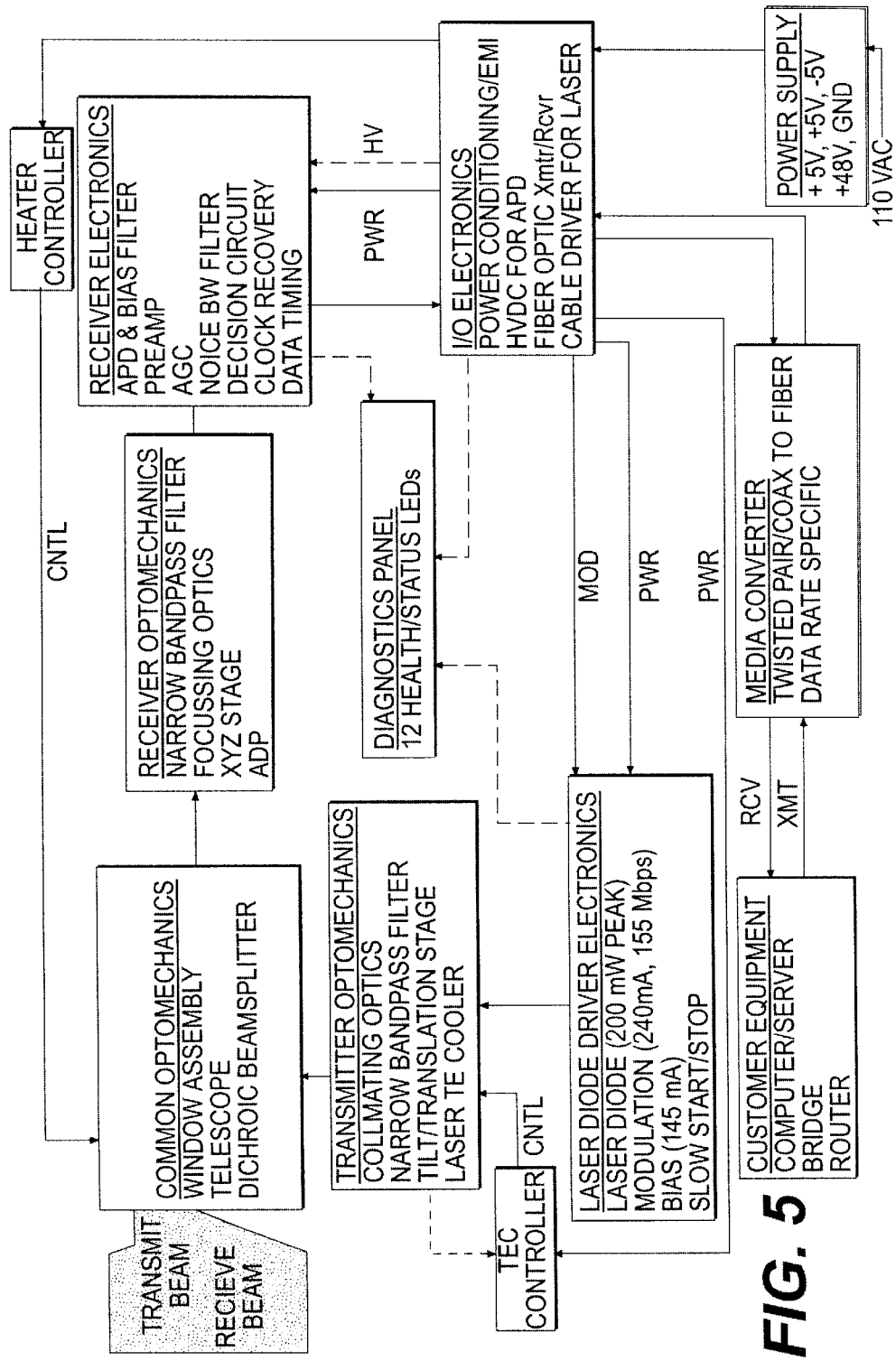
FIG. 5 is a functional block diagram of a preferred embodiment of the system according to the present invention.

FIG. 5 is a functional block diagram of a preferred embodiment of the system according to the present invention. The wideband, high-current laser driver electronics include slow-start and transient surge protection features for enhanced laser lifetime. The laser assembly is thermally isolated and actively cooled (or heated) with a TEC and a proportional-integral-differential temperature controller. Heat is simultaneously removed from the laser driver electronics by this same means. The laser driver circuitry is not activated until the laser has been cooled (or heated) to the operating setpoint temperature. The heat is transported from the laser to a large-capacity TEC by an insulated heat pipe for enhanced thermal transfer (as compared to a copper strap or bracket). The massive aluminum casting 94 is used as a thermal heat sink for optimal heat transfer. This thermal design offers superior laser lifetime in thermally stressing environments such as desert operation. The laser driver electronics board utilizes a ground plane, and is shielded on the remaining 5 sides by a metal cover to suppress radiated EMI from wideband high-current pulses that would otherwise impair the receiver electronics.

The receiver uses an APD for optimum sensitivity. The APD, its gain control, and the preamp and quantizer integrated circuits are preferably selected together to provide optimal receiver sensitivity and dynamic range. The preamp output is low pass filtered and AC-coupled into the quantizer, which is input to a clock recovery and data retiming device. The phase-locked-loop characteristics of this device are optimized for use in a fading atmospheric channel. The receiver circuitry employs differential inputs and outputs for common mode noise rejection and reduction of EMI emissions. The differential retimed data is input to a fiber-optic transceiver, providing a fiber output interface to the user equipment or an intermediate media converter. Similarly, the user input to the laser transmitter is via fiber to the fiber-optic transceiver.

Receiver dynamic range may be extended to provide communication at much closer ranges. An optically controlled automatic gain control (AGC) at the receiver, using voltage-controlled liquid crystal devices, is preferably provided in such applications to supplement electrical AGC circuits. As an alternative or in addition to optical automatic gain control at the receiver, the transmitter may be provided with an adaptive power control for short range communications.

Figure 6:
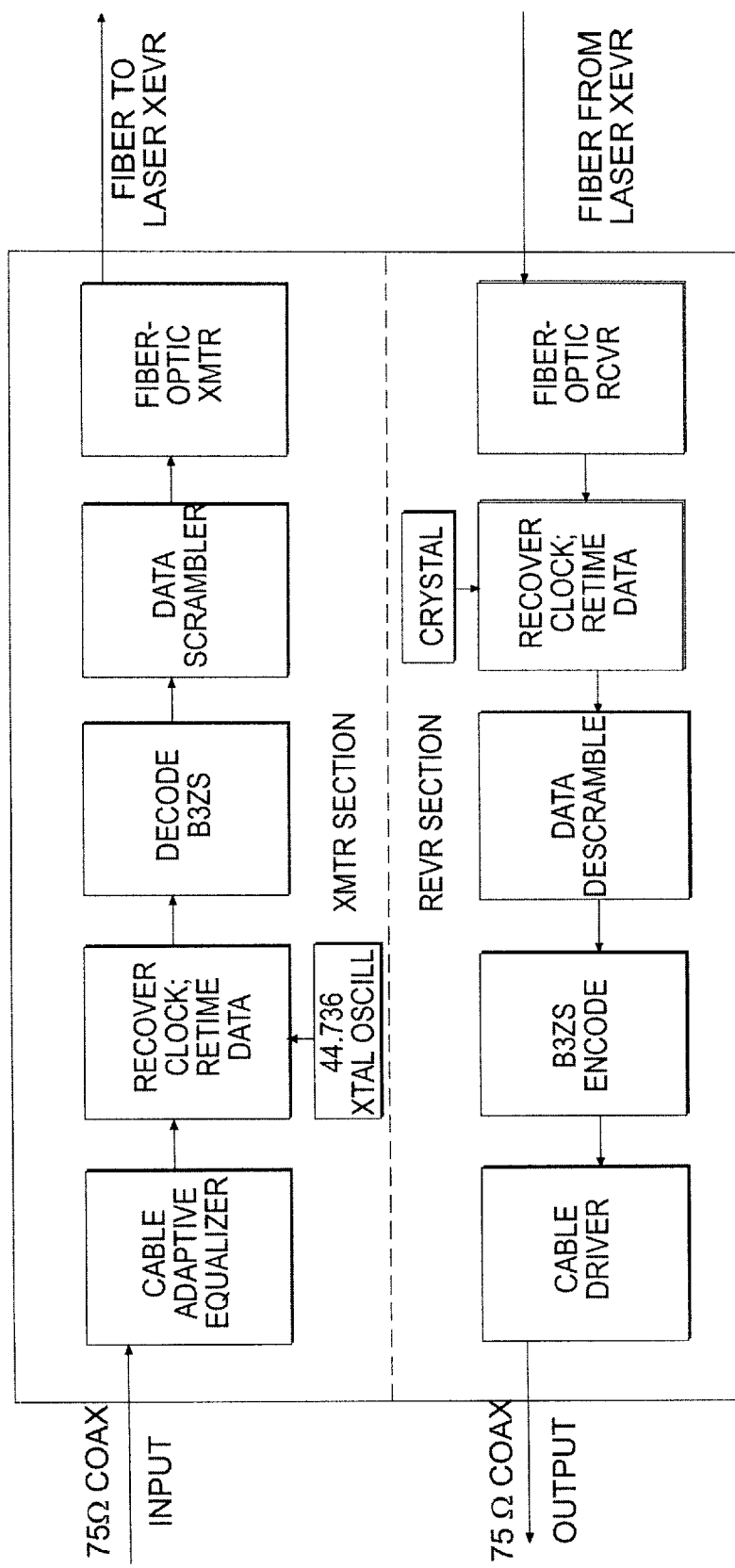
FIG. 6 is a block diagram of media converter functions performed in the preferred embodiment.
Figure 7:
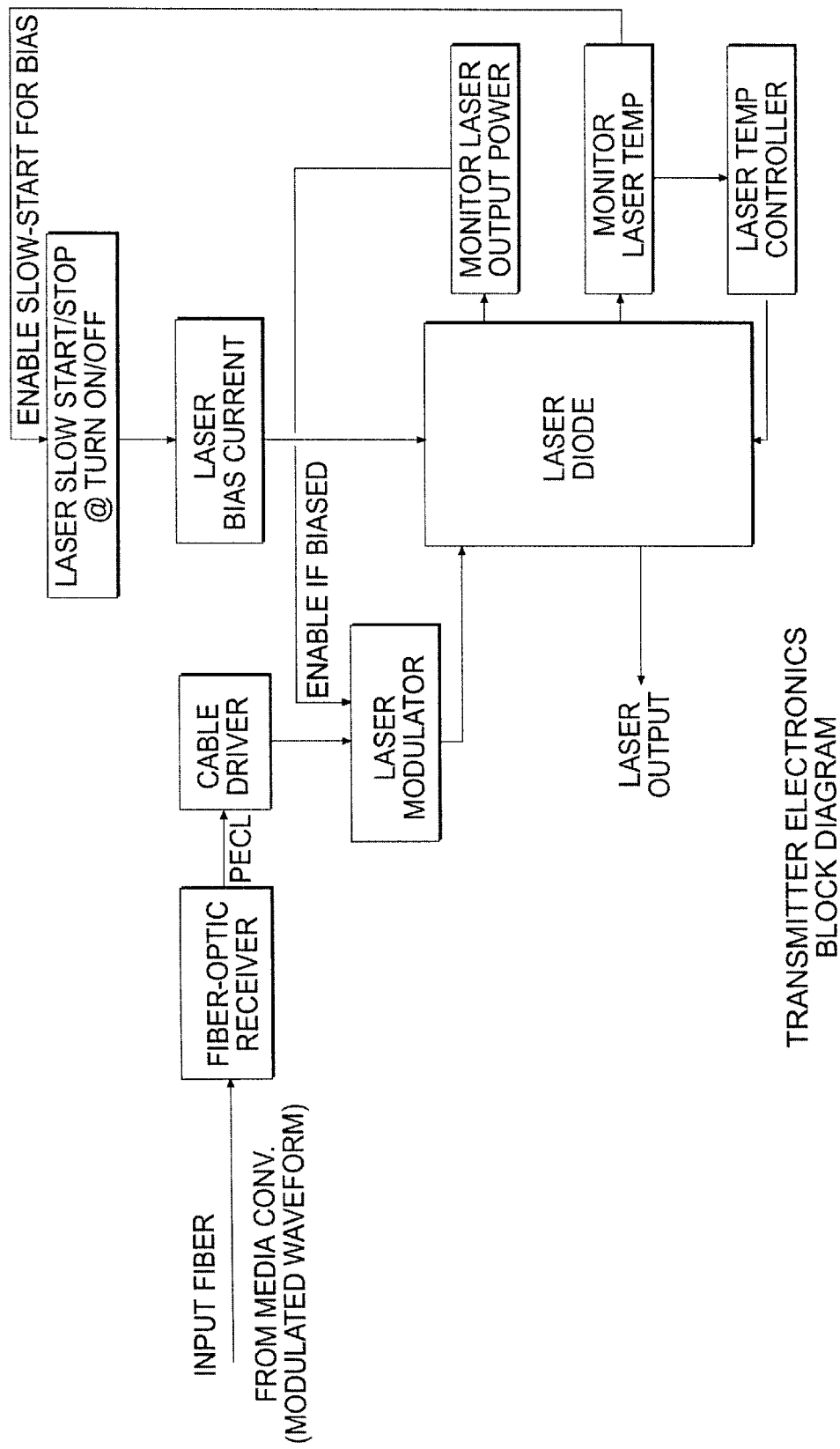
FIG. 7 is a block diagram of transmitter electronics according to the preferred embodiment.
Figure 8:
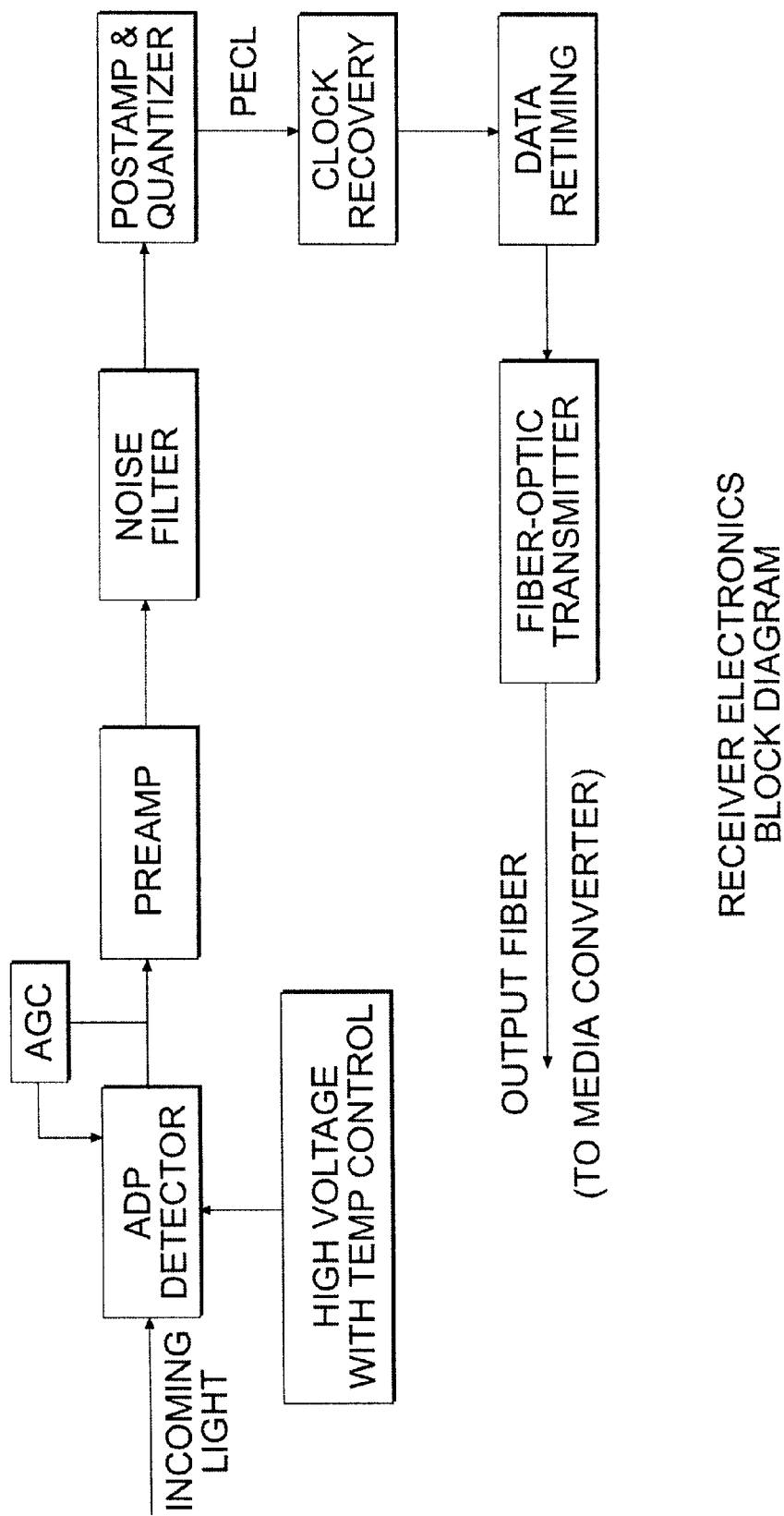
FIG. 8 is a block diagram of receiver electronics according to the preferred embodiment.
Figure 9:
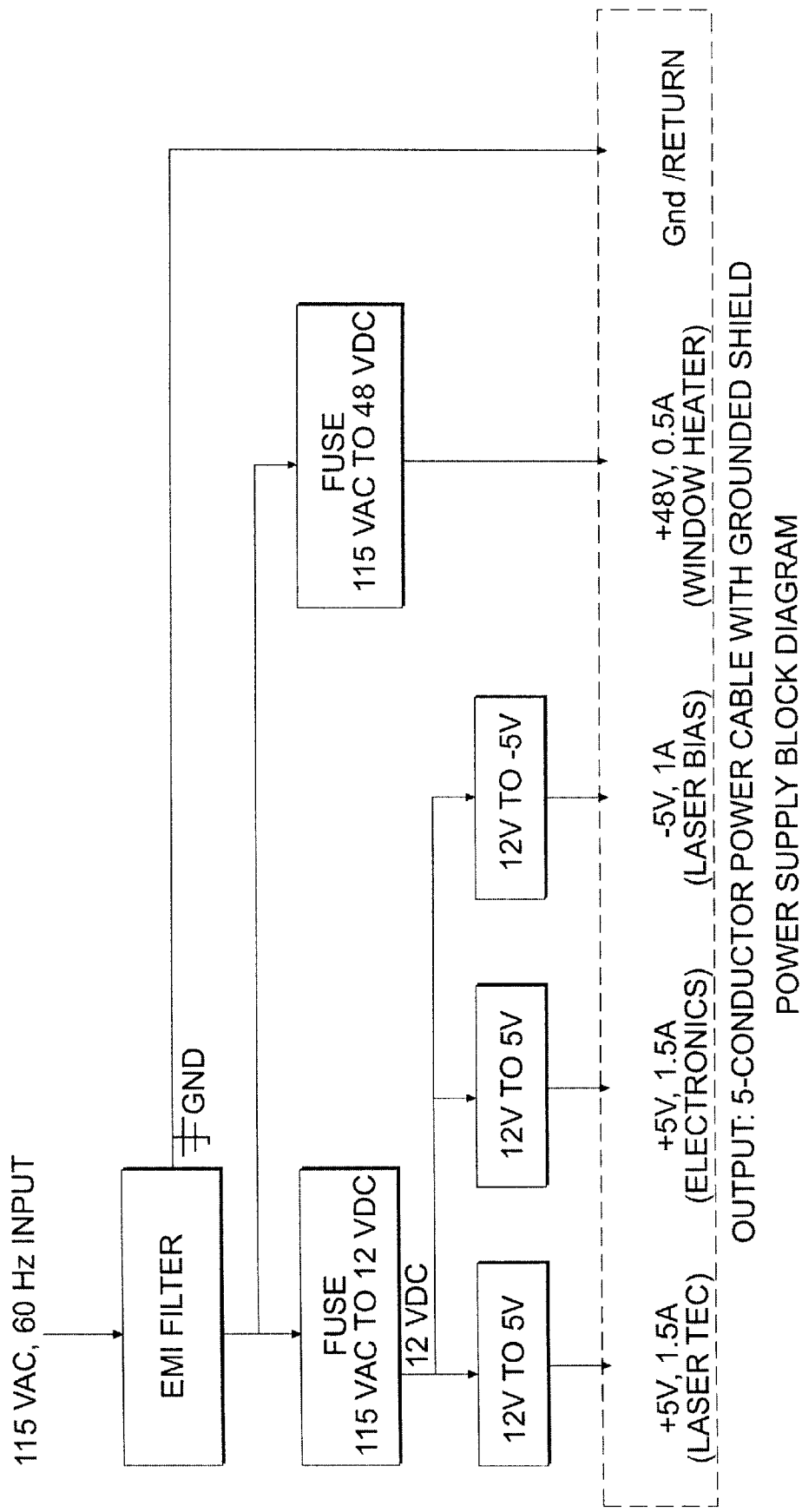
FIG. 9 is a block diagram of the power supply according to the preferred embodiment.
Figure 10:
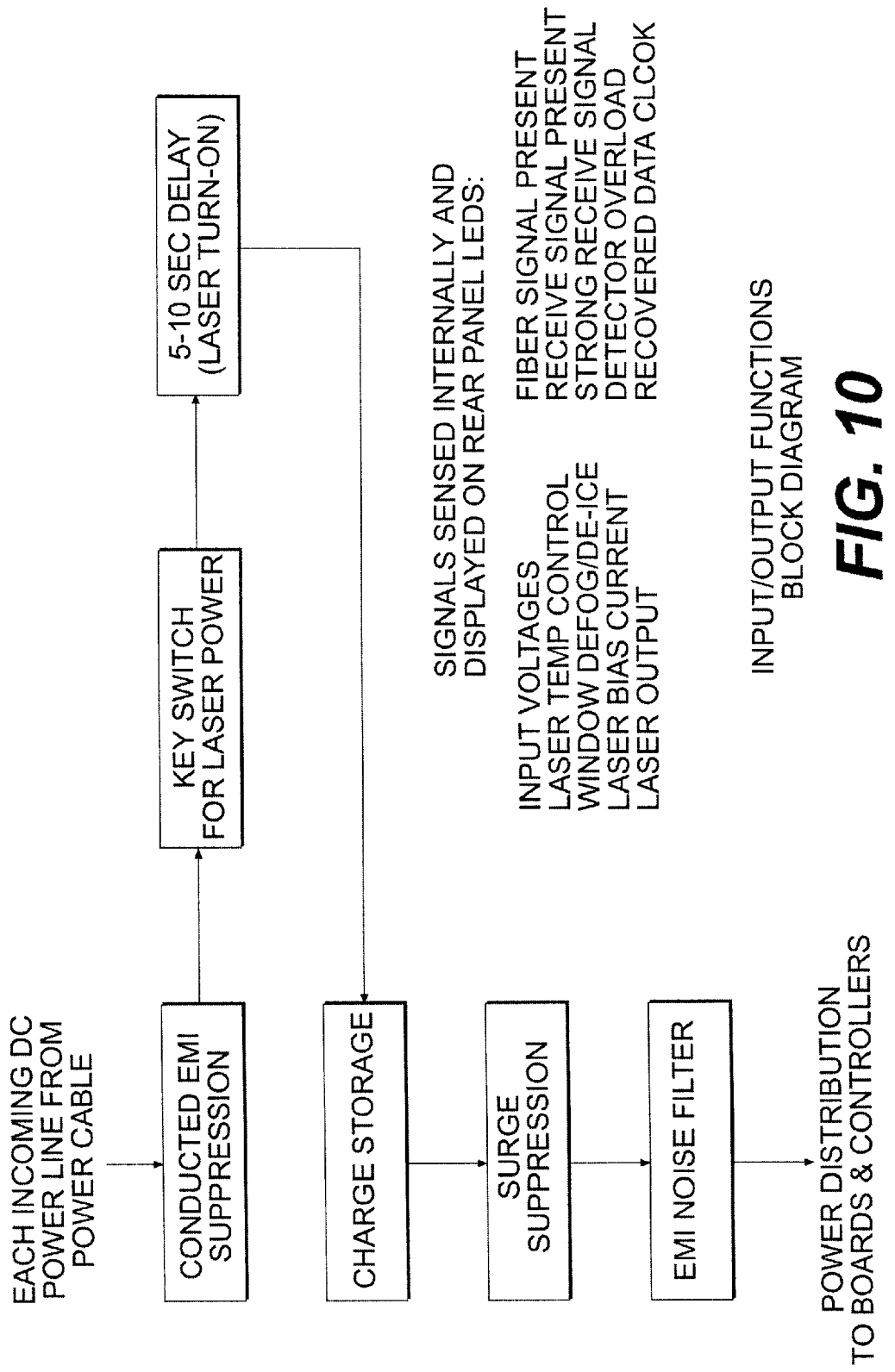
FIG. 10 is a block diagram of input/output functions performed in the preferred embodiment.

FIGS. 6 through 10 are block diagrams showing functional features of FIG. 5 in more detail. FIG. 6 is a block diagram of media converter functions. FIG. 7 is a block diagram of transmitter electronics. FIG. 8 is a block diagram of receiver electronics. FIG. 9 is a block diagram of the power supply, and FIG. 10 is a block diagram showing input/output functions.

The form of the data interface or interfaces provided for the laser communication terminal according to the present invention is dependent on the application. Typically, these interfaces will be based on computer and telecommunications standards, such as those employed in computer networks or telecom transmission equipment. For example, a standard fast Ethernet interface is provided in the preferred embodiment so that the communications system can be installed as a node in a computer network.

Alternatively, a video interface for devices compliant with the National Television Standards Committee (NTSC) specification may be provided and video data may be transmitted from a video camera or video recorder. Broadcast-quality digital TV at 45 Mbps is also possible. In another embodiment, an interface to a VGA computer display is provided. Full motion compressed video compliant with the Motion Picture Experts Group's MPEG-2 specification, or multiplexed video compliant with the MPEG or NTSC specifications, may be transmitted over these video interfaced links. Various transmission data rates may be provided depending on application requirements. In addition to 45 Mbps (DS-3) and 52 Mbps (Synchronous Optical NETwork (SONET) DC-1 and Asynchronous Transfer Mode (ATM)), data rates may include 100 Mbps (Fast Ethernet and Fiber Distributed Data Interface) and 155 Mbps (SONET OC-3c/ATM). Data rates of 622 Mbps and 1.25 Gbps (ATM, Fiber Channel, and Gigabit Ethernet) are also possible, although to achieve the highest data rates it may be necessary to reduce the link distance.

In one preferred embodiment, adaptive data rates are provided to reduce the data rate during bad weather to provide better penetration. For example, a DS-3 link at 45 Mbps might drop back to one of the tributaries at 1.5 Mbps during severe weather.

The system may be provided with a Common Data Link (CDL) interface to connect equipment for multiservice use at a variety of channel and data rates, typically up to 274 Mbps. The use of laser communications links for these applications makes possible covert and radio-silent transmissions.

The system according to the present invention includes both spectral and spatial filtering. The spectral filters include the cold mirror, bandpass filters, and a dichroic beamsplitter. Spatial filtering is primarily accomplished by an intermediate field stop, the field of view of the detector, and a baffle to block off-axis rays.

Performance is improved by controlling the wavelength of the diode laser to permit use of a narrow bandpass filter on both the transmit and receive side. This increases the signal-to-noise ratio by reducing spontaneous emission from the transmitter leaking into the receiver in the same transceiver (terminal) and reducing the background light collected by the receiving optics that would otherwise be focused onto the avalanche photodiode of the receiver. Without the thermoelectric cooler, the reliability of the transmitter decreases as the diode temperature increases.

Among other novel features which will be apparent to those skilled in the art upon detailed review of the specification, the invention incorporates the advances described below.

The distinctive cylindrical cast aluminum housing incorporates the following features integral to the casting: an integral hood for transmit/receive window protection, an integral sighting scope mount, and an integral cast heat sink. The cast aluminum housing also lowers production costs and includes mounting sites for electronic boards and a sighting scope on top of the unit. The sighting scope, which may be a conventional rifle scope, and may also incorporate a tracking sensor, is adjusted so its line of sight is the same as the receiver line of sight and the transmission axis of the outgoing laser beam. These three axes are aligned to high precision, either in a bench-top optical alignment system or by field alignment techniques. By looking through the scope or using a video camera, the user can pinpoint the aiming direction of both the receiver and transmitter by placing the crosshairs of the scope on the desired target.

The aluminum casting is a particularly cost-effective housing to facilitate volume production. The use of an aluminum mirror in conjunction with an aluminum casting allows for a thermally compensated design (e.g., secondary despace vs. primary radius of curvature change). The aluminum casting is mechanically rugged, and may be used as a massive heat sink for internally generated heat loads (e.g., from a thermoelectric cooler for the laser assembly, and/or from the laser driver board and/or other internal electronics).

A full-aperture plano window substrate avoids the cost of a large optic with power (as in a catadioptric design) and also avoids the cost and alignment of a spider assembly by providing a flat surface for bonding the secondary mirror directly to the window.

A full-aperture window with a cold-mirror coating and its mirrored appearance on the exterior window surface are provided to obtain the solar thermal control and background-light reflecting functions described above.

An electrically conductive film is provided on the interior surface of the window as a resistive heater for defogging and deicing. The telescope is protected by a glass window, on which the secondary mirror is mounted. This window is heated in one of two ways.

Figure 11:
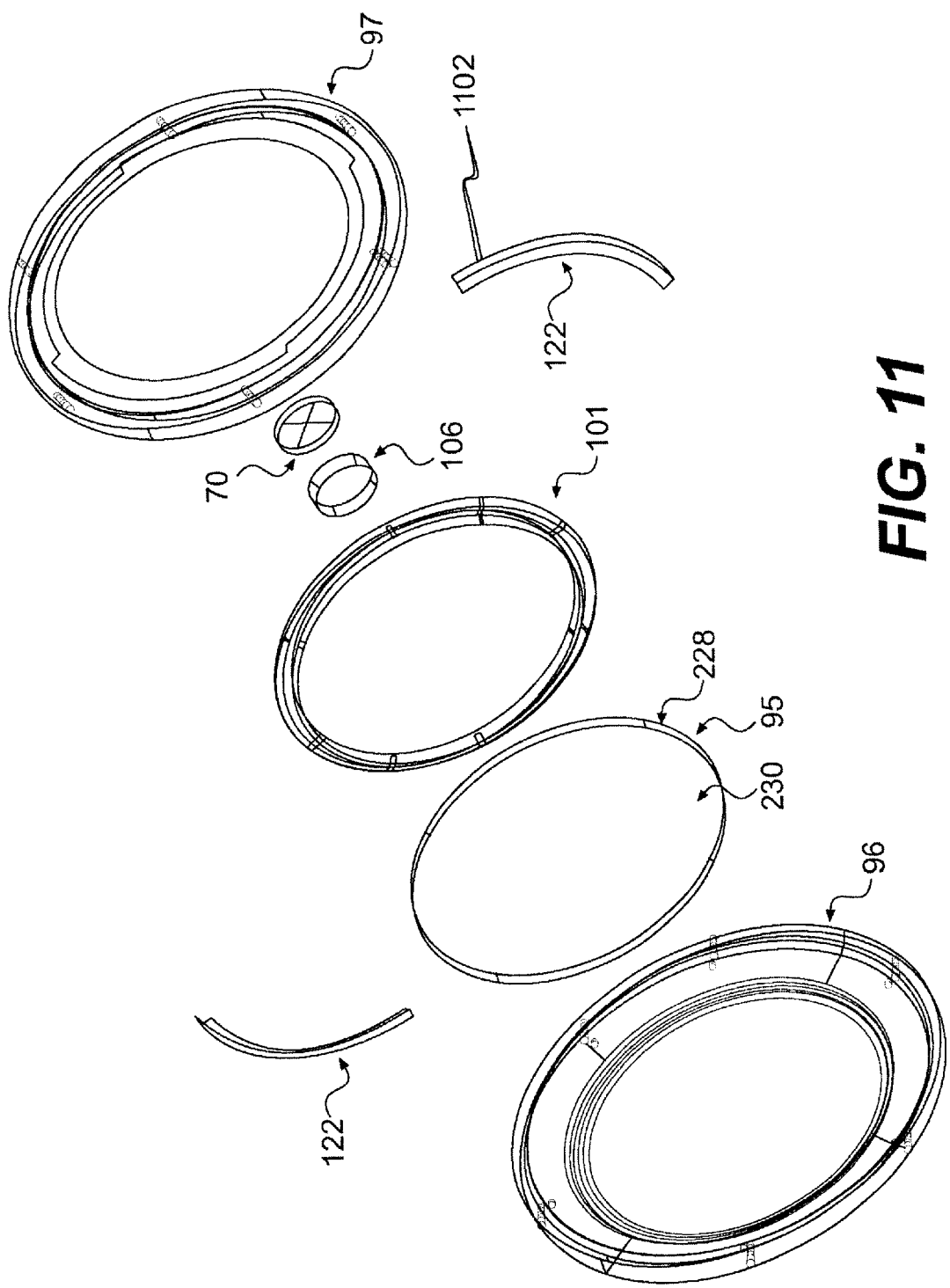
FIG. 11 is an exploded assembly drawing of a preferred embodiment of the heated window assembly of the present invention.

FIG. 11 is an exploded assembly drawing showing in more detail the preferred embodiment of the heated window assembly of the present invention, as shown in FIG. 1. Referring to FIG. 11, the preferred embodiment incorporates a monolithic window heater and solar reflector. A monolithic window element 95, which may be glass, is uniformly heated by providing an index-matched transparent resistive coating 228 such as Indium Tin Oxide (ITO) on an inner surface thereof, to prevent collection of frost, ice, or condensation. The opposing (exterior) surface of the same window is coated with a cold mirror coating 230 specifically designed to maximize the reflectance of solar radiation and the transmittance of the desired radiation (i.e., the transmit and receive beams). The coating 230 preferably reflects 98% of the solar energy in the visible spectrum, while passing the near-infrared laser energy with 95% efficiency. This monolithic window 95 provides optimum optical performance, by minimizing the number of surface/interfaces and by avoiding obscuring elements such as heating filaments.

Electrical conductors 122 are attached at the periphery of window 95 in electrical contact with resistive coating 228. Each of the electrical conductors 122 are provided with electrical leads 1102 connected to the current output of the heater controller, so that the heating element may be selectively powered using a proportional-integral-differential (PID) control algorithm of the heater controller in response to a sensed temperature variance to maintain a desired temperature setpoint. Window 95 is held in place between window mount 96, retaining ring 101, and window retainer 97. Secondary mirror 70 is mounted via spacer 106 to the inner surface of window 95.

Power consumption is greatly reduced by not heating the entire transceiver interior. FIG. 12 shows the window assembly of FIGS. 1 and 11 in its relationship with a sectional view of transceiver optical assembly 1202.

In both the embodiments of FIG. 2 and FIG. 11, a temperature controlled current is applied to the heating element or ITO to raise the temperature of the glass so that fogging, condensation, ice, and frost are eliminated. The cold-mirror coating reflects most of the background radiation and passes the desired communication wavelengths. This helps regulate the internal temperature of the transceiver and lowers the background radiation that can reach the detector. In general, circumferential heating of the window mount is less desirable because this circumferential heating results in inefficient, non-uniform heating of the window, with associated optical distortion. The thin-film transmissive resistive heater approach in the present invention provides a highly efficient means of uniformly applying heat across the full aperture, resulting in even heating and minimal power consumption.

The monolithic window structure shown in FIGS. 1 and 11 is preferred over the non-monolithic window structure shown in FIG. 2.

The parabolic primary mirror and mount are fabricated as a single piece on a massive aluminum substrate, with the mirror surface either diamond turned or produced as a replicated optic, with its mechanical strongback and optical reference functions and its matched thermal expansion to the aluminum casting that provides metering of the secondary mirror with respect to the primary. This custom mirror with its integrated mounting interfaces provides optimum performance at the wavelengths of interest due to the protective reflective coating and its integral interfaces which serve as a reference for the transceiver telescope and the transmit and receive optics. The use of a metal mirror (diamond-turned, replicated or electro-formed optic on an aluminum substrate) also provides volume manufacturing and cost advantages over a glass blank that must be ground and polished and often hand-figured in the final stages to achieve an aspheric (e.g., parabolic) surface. In the preferred embodiment, an aluminum mirror substrate is used for reasons of machinability, low cost, ruggedness, and thermal compatibility with an aluminum housing. The aluminum primary mirror substrate or master can be reproducibly machined under computer numerical control to a parabolic surface figure to provide first-order optical correction, relaxing design constraints for subsequent optics.

The transmit and receive beams are dichroic wavelength multiplexed, with an index-matched absorptive beam block on the cube beamsplitter, and the transmit beam axis is offset from the telescope receive optical axis to provide a transmit beam that is unobscured by the secondary mirror. Different transmit and receive wavelengths are separated with a dichroic beamsplitter element that controls the beam direction and provides enhanced transmit-receive channel isolation. This may be implemented with a cube beamsplitter having an internal dichroic coating at an angle, or other appropriate geometries, including a penta-prism with a dielectric coating through which the transmitted beam exits. A unique feature of this assembly is an optically opaque absorptive glass (or plastic) that is bonded to the beamsplitter with index-matching cement to absorb any leakage through the dichroic coating and thus optically terminate this path with very high efficiency. This is particularly useful to absorb laser energy that leaks through a dichroic coating, which can result in low-level reflections from subsequent surfaces (antireflection coated or otherwise) that interfere with the receiver sensitivity.

Thermoelectrically cooled laser assembly and drive electronics are provided for laser and system longevity, with a heat pipe as the preferred embodiment for efficient thermal transfer from the laser assembly to a large-capacity thermoelectric cooler mounted to a massive heat sink (e.g., the casting itself).

Figure 13:
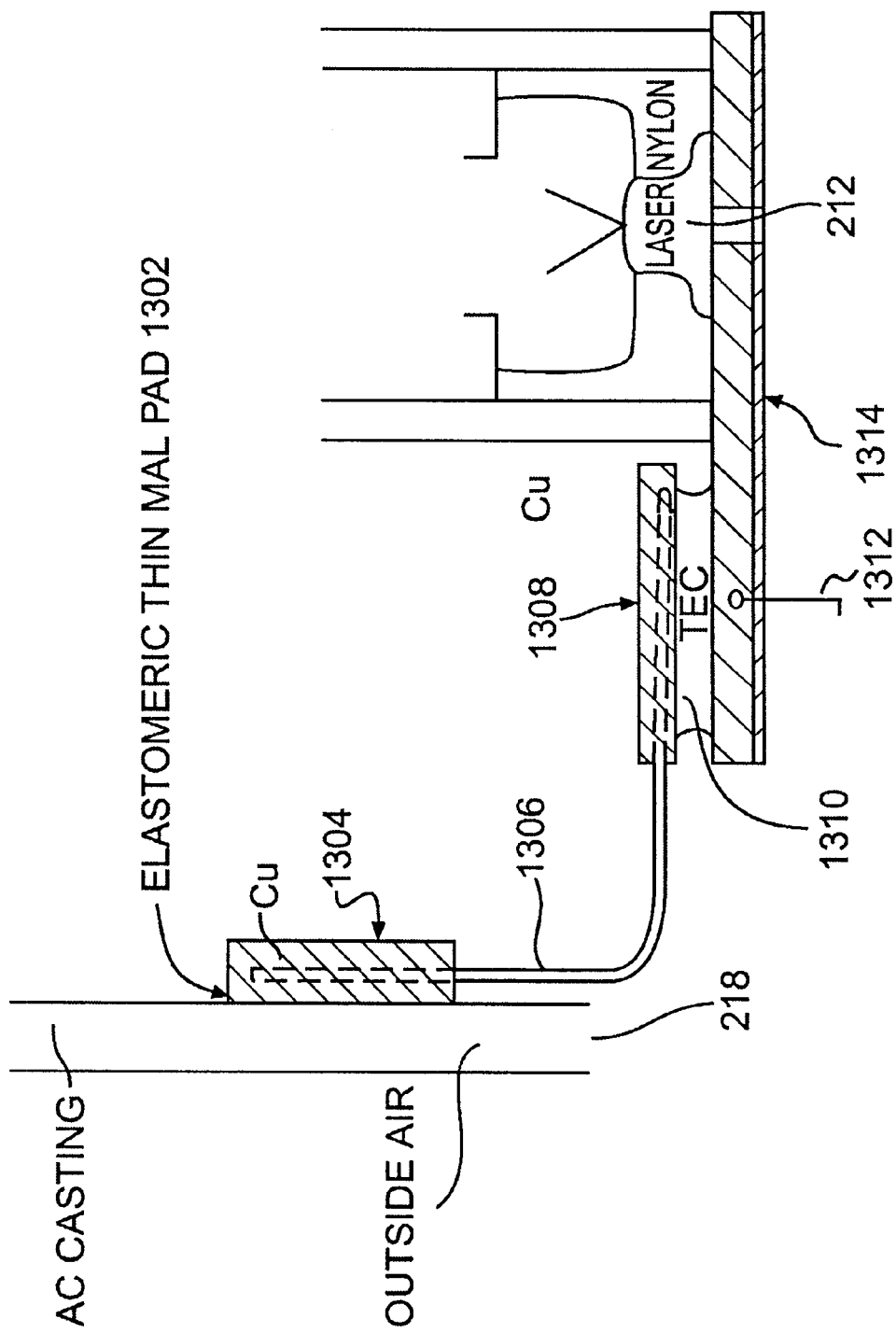
FIG. 13 shows a first embodiment of a heat pipe temperature control mechanism according to the invention.

FIG. 13 shows a first embodiment of a heat pipe laser temperature control mechanism according to the invention. As shown in FIG. 13, an elastomeric thermal pad 1302 is attached to aluminum housing 94 and a copper heat sink 1304 is mounted thereby to housing 94. A heat pipe 1306 is installed in a heat transfer relationship at each end within heat sink 1304 and heat sink 1308 and runs between these two heat sinks. A thermoelectric cooler 1310 is attached to heat sink 1308. On the other side of TEC 1310, a copper thermal strap 1312 (typically about 0.15" thick) is attached, through which TEC 1310 is thermally connected to laser 36. A thermal insulator 1314, such as cork, may be provided between thermal strap 1312 and a printed circuit board (not shown) containing driving circuits for laser 36. Connections between the circuit board and laser 36 are made through a hole or holes provided in strap 1312 and insulator 1314.

In operation, heat pipe 1306 removes heat from the hot side of TEC 1310, used for laser cooling, to the transceiver housing 94, which allows the water-filled heat pipe 1306 to operate much more efficiently by performing heat transport at elevated temperatures. Heat pipe 1306 in this implementation transfers heat from heat sink 1308 contacting the hot side of TEC 1310 to heat sink 1304 contacting aluminum housing 94. The "cold" side of TEC 1310 contacts thermal strap 1312 that directly contacts the diode laser 36. The preferred implementation incorporates a water-filled heat pipe which is very low cost, yet useable from sub-zero to desert conditions. In this configuration, the heat pipe is hot. Therefore, the fluid in the heat pipe can be-water rather than ammonia. Typical operating temperature ranges in degrees F are shown in the following table:

|  | Low | High |
| --- | --- | --- |
| Outdoor Temperature | 95 | 120 |
| Housing 218 | 110 | 135 |
| Heat Sink 1304 | 115 | 140 |
| Heat Sink 1308 | 120 | 145 |
| Thermal Strap 1312 | 90 | 90 |
| Laser 212 | 85 | 85 |

In the table above, the low range represents a change in temperature in the TEC of 30 degrees and the high range reflects a change in temperature in the TEC of 55 degrees.

Figure 14:
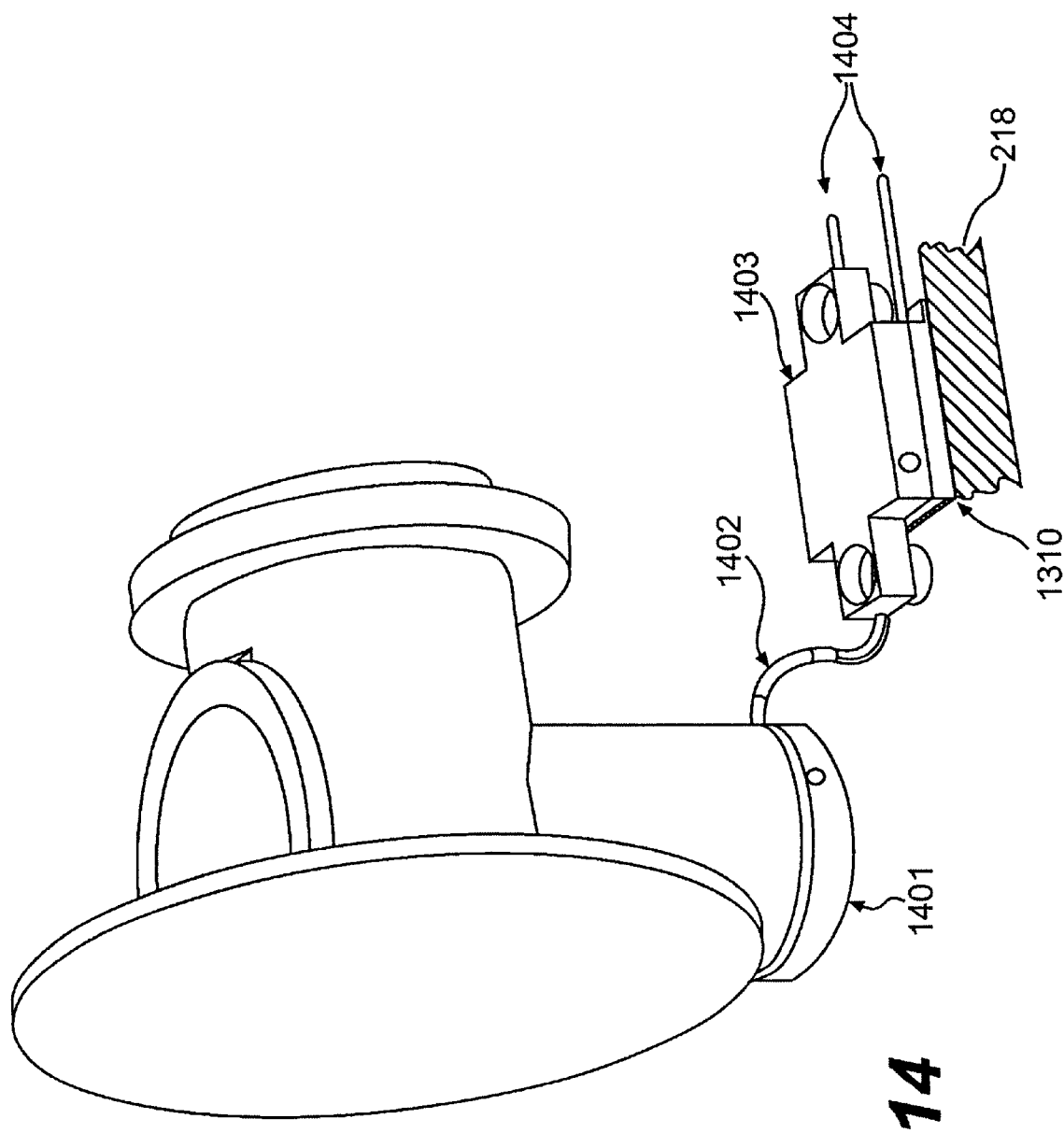
FIG. 14 shows a second embodiment of a heat pipe temperature control mechanism according to the invention.

In another embodiment, shown in FIG. 14, a copper heat sink 1401 is thermally attached to laser 36 (not shown in this drawing) and a coolant filled heat pipe 1402 is connected between heat sink 1401 and heat sink 1403. Heat sink 1403 is attached to thermoelectric cooler 1310 (having electrical leads 1404) which is attached in a heat transfer connection to aluminum housing 94.

Heat pipe 1402 cools the laser diode by providing a thermally conductive path between laser diode heat sink 1401 and thermoelectric cooler heat sink 1403. In this configuration, the TEC heat sink 1403 is cooled by the "cold" side of TEC 1310, and heat is removed from the subsystem through the interface between the "hot" side of TEC 1310 and the transceiver's aluminum housing 94. In this implementation, the heat pipe is cold when the TEC is active (or it may be cold when in storage or transported at high altitudes). To prevent the fluid in the heat pipe from freezing, a fluid should be chosen with a freezing point outside the expected ambient temperature range (−40 F.) such as ammonia.

These thermal subsystems provide a thermally conductive path to directly and efficiently dissipate the heat removed by a thermoelectric cooler to the cast aluminum housing, which effectively serves as the system heat sink. The thermally conductive path is more efficient and thereby provides better system performance over convective cooling approaches.

Alternative embodiments of the designs of FIGS. 13 and 14 use a thermal heat strap (e.g., a copper strap) instead of a heat pipe, which provides good performance in most environments, but is not preferred in extreme environments such as desert conditions. Generally, although such copper straps or braids will transport waste heat to a nearby heat sink, this approach is less preferred because it results in significant losses, proportional to distance and inversely proportional to strap thickness, leading to undesirable layout constraints and wide, thick inflexible straps.

Thus, the use of a heat pipe in the preferred embodiment to transport heat from the laser diode assembly to a remote heat sink, such as the massive housing, is a uniquely valuable feature. This feature allows the laser assembly to be located based on considerations other than proximity to a massive heat sink, since the waste heat is efficiently transported virtually independent of the heat pipe length and routing geometry.

The optomechanical design for the internal optics, referred to in the preferred embodiment, consists of two main subassemblies (receiver tube and transmitter tube) that facilitate rapid assembly and accurate boresight alignment of the transmit and receive beams. The receiver tube is fastened to the primary mirror substrate, which acts as an optomechanical reference surface for the internal optics.

Alternative embodiments of the invention can be realized as optical elements with somewhat different optical prescriptions and spacings. For example, one alternative embodiment incorporates many of the optical components bonded together into a solid-optics assembly. Other alternative embodiments include a full-aperture transmit laser beam, rather than a subaperture beam with an offset axis to avoid blockage by the secondary mirror, primarily for reasons of enhanced laser eye safety.

In another embodiment, a biconcave optic is provided for a secondary mirror, with an anti-reflection coating on the interior surface and a reflective coating on the side facing the window. This approach offers better optical quality at somewhat higher cost. The optic can be bonded in a small cup-shaped mount bonded to the window or bonded directly to the window around its outer edge.

As another option, closed-loop tracking of the incoming laser energy from a laser communication terminal may be provided by means of a position-sensing detector (e.g., a quadrant or Charge-Coupled Device (CCD) detector) and processing electronics unit that is affixed to the sighting scope eyepiece for the purpose of controlling an internal 2-axis steering device (or an external gimbal, e.g., elevation-over-azimuth) that deviates the output laser beam direction in accordance with the time-varying position-sensing detector error signal. This position sensor and electronics may also be incorporated internally, instead of attached to the sighting scope, using a second beamsplitter cube to sample a small portion of the received energy. In this embodiment, a pair of laser communications terminals can maintain their link where the mounting is unstable or there is modest platform motion.

In a further embodiment, forward error correction block codes with very deep interleaving (prior to the transmitter electronics and subsequent to the receiver electronics) are provided for correction of burst errors arising from atmospheric scintillation. This embodiment is particularly useful where error-free transmission is required without the benefit of retransmission protocols.

An autoranging feature is provided, in another embodiment, by providing a collimating lens which is moved longitudinally in the optical axis to adjust beam divergence via a voice coil, or using a liquid crystal lens after the collimating lens. This permits changing the beam divergence electronically to achieve a desired range.

The present invention provides numerous practical advantages over prior art systems. First, because of the design and system implementation described in the preferred embodiment (e.g., cast aluminum housing, monolithic primary mirror and mount, two major optomechanical subassemblies with drop-in tolerances for the optical components etc.), the laser communication terminals of the present invention are amenable to volume production. By eliminating expensive components (e.g., large-aperture catadioptric lenses) and costly manufacturing processes (e.g., large machined housings, a hand-figured parabolic mirror with separate mounting fixture, and labor intensive assembly), and by simplifying alignment requirements through drop-in optics, significantly lower manufacturing costs in volume production are achieved, compared to other systems currently on the market.

The overall design of the system disclosed is particularly rugged and robust. For example, the window heating and laser thermal control features provided herein are more effective and better suited to continuous extended use in extreme environmental conditions than prior art designs. The design also utilizes a larger collecting aperture and a higher power laser and higher current driver than most other systems on the market. This enables the system to be used for more stressing applications, such as longer ranges or higher link availability, than is possible with other systems.

While the invention has been particularly shown and described with reference to a preferred embodiment thereof, it will be understood by those skilled in the art that various changes in form and details may be made therein without departing from the spirit and scope of the invention.

The embodiments of the invention in which an exclusive property or privilege is claimed are defined as follows:

1. A dichroic wavelength-multiplexed laser communication system for full duplex wideband data transmission in excess of 1.5 Mbps between buildings at distance of 1–20 km and with unobstructed line of sight, comprising:

first terminal means having a first laser source for transmitting laser light at a first wavelength; a first laser receiver means for receiving laser light at a second wavelength; and a first optical system through which both said laser light at said first wavelength and said laser light at said second wavelength travel, said first optical system including first optical means for multiplexing said transmitted laser light at said to first wavelength and said received laser light at said second wavelength; and second terminal means having a second laser source for transmitting said laser light at said second wavelength; a second laser receiver means and receiving said laser light at said first wavelength; and a second optical system through which both said laser light at said first wavelength and said laser light at said second wavelength travel, said second optical system including second optical means for multiplexing said transmitted laser light at said second wavelength and said received laser light at said first wavelength, wherein each of said first and second laser sources includes laser diode means for generating laser light and formed so as to generate at a power level so as to transmit laser light in excess of 1 km and 1.5 Mbps, and thermoelectric cooler means for actively cooling said laser diode means.

2. The laser communication system according to claim 1, wherein said first and second optical systems comprise first and second cassegrain receivers, respectively, each cassegrain receiver having a primary and a secondary mirror for directing said received laser light and said transmitted laser light.

3. The laser communication system according to claim 2, wherein said first cassegrain receiver comprises a primary and a secondary mirror, and wherein the beam axis of said transmitted laser light at said first wavelength is offset from the beam axis of said received laser light at said second wavelength, whereby the beam path of said transmitted laser light at said first wavelength is unobscured by said secondary mirror.

4. The laser communication system according to claim 1, wherein said first and second optical means for multiplexing respectively comprise first and second dichroic beamsplitters.

5. The laser communication system according to claim 4, wherein said first and second dichroic beamsplitters respectively comprise first and second index-matched absorptive beam blocking means.

6. The laser communication system according to claim 5, wherein said first and second index-matched absorptive beam blocking means each comprise optically opaque absorptive glass or plastic bonded to the respective beamsplitter with index-matching cement.

7. A laser communication system according to claim 1, wherein at least said second optical system of said second terminal means includes an aspheric primary mirror comprising a single point diamond-turned mirror surface formed on an aluminum substrate as a single piece.

8. The laser communication system according to claim 7, wherein said aspheric primary mirror has a nominal clear aperture of four to ten inches.

9. A laser communication system according to claim 1, wherein each of said first and second terminal means further includes:

a housing;
   a window element in said housing and having a transparent resistive coating; and
   means for controlling a temperature of said window element by applying electrical current to said transparent resistive.

10. The laser communication system according to claim 9, wherein said transparent resistive coating is formed from indium tin oxide.

11. The laser communication system according to claim 9, wherein said means for controlling the temperature of said window means includes electrical conductors attached at the periphery of said window element and in electrical contact with said transparent resistive coating.

12. The laser communication system according to claim 9, wherein said temperature controlling means further includes a heater controller for selectively applying electrical current in response to a sensed variance in temperature of said window element.

13. The laser communication system according to claim 12, wherein said heater controller comprises means for applying a proportional-integral-differential control algorithm in selectively applying electrical current.

14. The laser communication system according to claim 9, wherein said window element further includes an exterior surface coated with a cold mirror coating which reflects solar radiation while transmitting the laser light of its respective laser transmission source.

15. The laser communication system according to claim 1, wherein each of said first and second terminal means further includes a heat pipe for thermal transfer from said laser diode to said thermoelectric cooler.

16. The laser communication system according to claim 1, wherein said thermoelectric cooler is mounted to a housing of said first terminal means, wherein said housing is further formed as a heat sink so as to dissipate heat from said thermoelectric cooler.

17. The laser communication system according to claim 1, wherein, said laser diode means is further formed to generate laser light at a power level of at least 200 milliwatts.

18. The laser communication system according to claim 1, wherein said laser diode means comprises a 200 milliwatt GaAs diode laser.

19. The laser communication system according to claim 1, wherein each of said first and second terminal means further includes a proportional-integral-differential temperature controller for controlling said thermoelectric cooler means.

20. A laser communication system according to claim 1, wherein each of said first and second terminals further includes:
an autoranging system having a collimating lens in the optical axis of said laser light at a first wave length, and electronic translation means for moving said collimating lens longitudinally in said optical axis to adjust beam divergence, whereby beam divergence is adjusted electronically to achieve a desired range.

21. The laser communication system for data transmission according to claim 20, wherein said electronic translation means comprises a voice coil.

22. A laser communication system according to claim 1 further comprising:
a sighting scope for aiding in positioning said first terminal;
a closed-loop tracking system for tracking incoming laser energy, including a position-sensing detector associated with said sighting scope for generating a time-varying error signal; steering means for deviating the direction of said transmitted modulated laser light; control electronics for controlling said steering means in accordance with the time-varying position-sensing detector error signal, wherein said tracking system is formed so as to maintain said first terminal and said second terminal means in communication with each other in the presence of unstable mounting or platform motion.

23. The laser communication system for data transmission according to claim 22, wherein said position-sensing detector includes a quadrant detector.

24. The laser communication system for data transmission according to claim 22, wherein said position-sensing detector includes a CCD detector.

25. A method of operating a laser communication system for data transmission for data transmission in excess of 1.5 Mbps between buildings at distance of 1–20 km and with unobstructed line of sight, comprising the steps of:
providing a laser transmitter, thermoelectric cooler means, transmitter electronics and receiver electronics;
generating laser light with said laser transmitter at a power level to transmit laser light in excess of 1 km and 1.5 Mbps;
actively cooling said laser transmitter with said thermoelectric cooler means;
modulating transmitted laser light with said transmitter electronics in accordance with data to be transmitted;
detecting said transmitted modulated laser light and generating an electrical signal corresponding thereto;
demodulating said corresponding electrical signal with said receiver electronics;
correcting burst errors arising from atmospheric scintillation with forward error correction block codes and deep interleaving both prior and subsequent to the demodulating step.

26. A dichroic wavelength-multiplexed laser communication system for full duplex wideband data transmission in excess of 1.5 Mbps between buildings at distance of 1–20 km and with unobstructed line of sight, comprising:
first terminal means having a first laser source for transmitting laser light at a first wavelength; a first laser receiver means for receiving laser light at a second wavelength; and a first optical system through which both said laser light at said first wavelength and said laser light at said second wavelength travel, said first optical system including first optical means for multiplexing said transmitted laser light at said to first wavelength and said received laser light at said second wavelength; and
second terminal means having a second laser source for transmitting said laser light at said second wavelength; a second laser receiver means and receiving said laser light at said first wavelength; and a second optical system through which both said laser light at said first wavelength and said laser light at said second wavelength travel, said second optical system including second optical means for multiplexing said transmitted laser light at said second wavelength and said received laser light at said first wavelength, wherein
each of said first and second laser sources includes a housing; a laser transmission source in said housing for transmitting modulated laser light;
a window element in said housing through which said transmitted modulated laser light travels, said window element having a transparent resistive coating;
means for controlling a temperature of said window element by applying electrical current to said transparent resistive coating; laser diode means for generating laser light and formed so as to generate at a power level so as to transmit laser light in excess of 1 km and 1.5 Mbps;
thermoelectric cooler means for actively cooling said laser diode means;
an autoranging device including a collimating lens in the optical axis of said laser light and electronic translation means for moving said collimating lens longitudinally in said optical axis to adjust beam divergence so as to adjust beam divergence and thereby achieve a desired range; a sighting scope for aiding in positioning said first terminal means; and
a closed-loop tracking system for tracking incoming laser energy, including a position-sensing detector associated with said sighting scope for generating a time-varying error signal, steering means for deviating the direction of said transmitted modulated laser light with said steering means, and control electronics for controlling said steering means in accordance with the time-varying position-sensing detector error signal so as to maintain said first terminal means and said second terminal means in a communication link with each other in the presence of unstable mounting or platform motion.

27. The laser communication system according to claim 26, wherein said first and second optical systems each include first and second cassegrain receivers, respectively, each cassegrain receiver having a primary and a secondary mirror for directing received laser light and transmitted laser light.

28. The laser communication system according to claim 27, wherein said first cassegrain receiver comprises a primary and a secondary mirror, and the beam axis of said transmitted laser light at said first wavelength is offset from the beam axis of said received laser light at said second wavelength whereby the beam path of said transmitted laser light at said first wavelength is unobscured by said secondary mirror.

29. The laser communication system according to claim 26, wherein said first and second optical means for multiplexing respectively include first and second dichroic beamsplitters.

30. The laser communication system according to claim 26, wherein said first and second dichroic beamsplitters respectively include first and second index-matched absorptive beam blocking elements.

31. The laser communication system according to claim 30, wherein said first and second index-matched absorptive beam blocking elements each include optically opaque absorptive glass or plastic bonded to the respective beamsplitter with index-matching cement.

32. A laser communication system according to claim 26, wherein said second terminal means further includes an optical system having an aspheric primary mirror having a single point diamond-turned mirror surface formed on an aluminum substrate as a single piece.

33. The laser communication system according to claim 32, wherein said aspheric primary mirror has a nominal clear aperture of four to ten inches.

34. The laser communication system according to claim 26, wherein said transparent resistive coating comprises indium tin oxide.

35. The laser communication system according to claim 26, wherein said temperature controlling means includes electrical conductors attached at the periphery of said window means in electrical contact with said transparent resistive coating.

36. The laser communication system according to claim 26, wherein said temperature controlling means further includes a heater controller for selectively applying electrical current in response to a sensed variance in temperature of said window.

37. The laser communication system according to claim 36, wherein said heater controller is further formed to apply a proportional-integral-differential control algorithm.

38. The laser communication system according to claim 26, wherein each said window element includes an exterior surface which is coated with a cold mirror coating which reflects solar radiation while transmitting laser light of a respective laser transmission source.

39. The laser communication system according to claim 26, wherein each of said first and second terminals further include a heat pipe for conducting thermal transfer from said laser diode to said thermoelectric cooler.

40. The laser communication system according to claim 26, wherein said thermoelectric cooler is mounted to said housing in each of said first and second terminal means, said housing being further formed as a heat sink to dissipate heat from said thermoelectric cooler.

41. The laser communication system according to claim 26, wherein said laser diode means is further formed to generate laser light at a power level of at least 200 milliwatts.

42. The laser communication system according to claim 26, wherein said laser diode means comprises a 200 milliwatt GaAs diode laser.

43. The laser communication system according to claim 26, said thermoelectric cooler means includes a proportional-integral-differential temperature controller.

44. The laser communication system according to claim 26, wherein said electronic translation means comprises a voice coil.

45. The laser communication system according to claim 26, wherein said position-sensing detector comprises a quadrant detector.

46. The laser communication system according to claim 26, wherein said position-sensing detector comprises a CCD detector.

47. A method of operating a laser communication system for data transmission for data transmission in excess of 1.5 Mbps between buildings at distance of 1–20 km and with unobstructed line of sight, comprising the steps of:

provoking a laser transmitter, thermoelectric cooler means, transmitter electronics, receiver electronics, a window element with a transparent resistive coating, a collimating lens in the optical axis of said laser light, a sighting scope, a position-sensing detector associated with said sighting scope, and steering means;

generating laser light with said laser transmitter at a power sufficient to travel in excess of 1 km and 1.5 Mbps;

actively cooling said laser transmitter with said thermoelectric cooler means;

modulating transmitted laser light with said transmitter electronics in accordance with data to be transmitted;

detecting said transmitted modulated laser light and generating an electrical signal corresponding thereto;

applying electrical current to said transparent resistive coating through which said modulated laser light travels so as to control the temperature of said window element;

moving said collimating lens longitudinally in said optical axis so as to adjust beam divergence and thereby achieve a desired range;

positioning said laser transmitter with said sighting scope;

generating a time-varying error signal with said a position-sensing detector;

deviating the direction of said modulated laser light with said steering means;

controlling said steering means with the control electronics in accordance with the time-varying position-sensing detector error signal so as to operate said laser transmitter in the presence of unstable mounting or platform motion;

demodulating said corresponding electrical signal with said receiver electronics;

correcting burst errors arising from atmospheric scintillation with forward error correction block codes and deep interleaving prior and subsequent to the modulating step.

* * * * *